US012714889B2

(12) United States Patent
Krissun

(10) Patent No.: US 12,714,889 B2
(45) Date of Patent: Aug. 25, 2026

(54) OXYGEN MASK FOR USE IN AN AIRCRAFT, EMERGENCY OXYGEN SYSTEM, AND AIRCRAFT

(71) Applicant: B/E Aerospace Systems GmbH, Luebeck (DE)

(72) Inventor: Jens Krissun, Luebeck (DE)

(73) Assignee: B/E AEROSPACE SYSTEMS GmbH, Luebeck (DE)

( * ) Notice: Subject to any disclaimer, the term of this patent is extended or adjusted under 35 U.S.C. 154(b) by 1099 days.

(21) Appl. No.: 17/691,418

(22) Filed: Mar. 10, 2022

(65) Prior Publication Data

US 2022/0288429 A1 Sep. 15, 2022

(30) Foreign Application Priority Data

Mar. 11, 2021 (EP) .................................... 21162094

(51) Int. Cl.
*A62B 7/14* (2006.01)
*A62B 18/08* (2006.01)
(Continued)

(52) U.S. Cl.
CPC ................ *A62B 7/14* (2013.01); *A62B 18/08* (2013.01); *A62B 18/084* (2013.01); *A62B 18/10* (2013.01);
(Continued)

(58) Field of Classification Search
CPC ....... A62B 18/025; A62B 18/08; A62B 18/10; A62B 7/14; A62B 18/02; A62B 9/02;
(Continued)

(56) References Cited

U.S. PATENT DOCUMENTS 3,467,093 A * 9/1969 Hotz ...................... A62B 18/02 128/205.24
4,559,939 A * 12/1985 Levine ............... B64D 11/0632 128/201.15
(Continued)

FOREIGN PATENT DOCUMENTS

DE 102017222422 A1 * 6/2019 ............. B64D 11/00
ES 2290128 T3 * 2/2008 .......... A61M 16/085
(Continued)

OTHER PUBLICATIONS

EPO, European Search Report dated Aug. 24, 2021 with EP Serial No. 21162094.

(Continued)

*Primary Examiner* — Brandy S Lee
*Assistant Examiner* — Rohan Patel
(74) *Attorney, Agent, or Firm* — SNELL & WILMER L.L.P.

(57) ABSTRACT

An oxygen mask for use in an aircraft includes a base, the base having an oxygen port for an inflow of oxygen from an oxygen source; a face piece, protruding from a peripheral portion of the base and surrounding a breathing space; a re-directing portion, spaced from the base and arranged over the oxygen port within the breathing space; and at least one lateral opening between the base and the re-directing portion, the at least one lateral opening providing a fluid connection between the oxygen port and the breathing space.

14 Claims, 5 Drawing Sheets

(51) Int. Cl.
*A62B 18/10* (2006.01)
*B64D 11/00* (2006.01)

(52) U.S. Cl.
CPC ........ *B64D 11/00* (2013.01); *B64D 2231/025* (2013.01)

(58) Field of Classification Search
CPC ............................ A62B 18/084; B64D 11/00; B64D 2231/025; A61M 16/06; A41D 13/11
See application file for complete search history.

(56) References Cited

U.S. PATENT DOCUMENTS 5,265,597 A * 11/1993 Wallis .................. A62B 18/025 128/205.24
5,357,949 A 10/1994 Bertheau et al.
5,408,995 A * 4/1995 Contino ................... A62B 7/14 128/205.24
5,465,712 A * 11/1995 Malis .................... A61M 16/06 128/912
5,709,204 A * 1/1998 Lester ...................... A62B 7/10 128/203.29
7,584,753 B2 9/2009 Aubonnet et al.
8,042,540 B2 * 10/2011 McDonald ......... A61M 16/0611 128/206.28
8,733,352 B2 5/2014 Bailey et al.
9,468,780 B2 10/2016 Cannon
9,580,177 B2 2/2017 Kshirsagar et al.
9,849,313 B2 12/2017 Aubonnet et al.
10,967,205 B2 * 4/2021 Elliott .................... A62B 18/02
2006/0169283 A1 * 8/2006 Schaeffer ............. A62B 25/005 128/205.27
2007/0056588 A1 * 3/2007 Hayek ................... A61M 16/06 128/205.25
2018/0228997 A1 8/2018 Krentler et al.
2018/0280738 A1 * 10/2018 Gabriel ................ A62B 18/025
2018/0289991 A1 * 10/2018 Wheatley ............... A62B 18/10
2019/0152610 A1 5/2019 Rittner et al.
2019/0185166 A1 6/2019 Neumann et al.
2019/0321663 A1 * 10/2019 Nestelroad ........... A62B 18/025
2020/0376305 A1 * 12/2020 Lang ........................ A62B 9/02
2021/0346731 A1 * 11/2021 Trishaun .............. A61B 5/0823
2021/0346734 A1 * 11/2021 Newson ................... A62B 7/10
2021/0370105 A1 * 12/2021 Chen ...................... A62B 23/02

FOREIGN PATENT DOCUMENTS

WO 20080138930 11/2008
WO WO-2012091907 A1 * 7/2012 ............ A61M 16/06

OTHER PUBLICATIONS

European Patent Office, European Office Action dated Oct. 21, 2025 in Application No. 21162094.3.

* cited by examiner

OXYGEN MASK FOR USE IN AN AIRCRAFT, EMERGENCY OXYGEN SYSTEM, AND AIRCRAFT

CROSS-REFERENCE TO RELATED APPLICATIONS

This application claims priority to, and the benefit of, EP Application No. 21162094.3, entitled "OXYGEN MASK FOR USE IN AN AIRCRAFT, EMERGENCY OXYGEN SYSTEM, AND AIRCRAFT," filed on Mar. 11, 2021, which is hereby incorporated by reference in its entirety.

FIELD

The present invention is in the field of aircraft equipment. In particular, the present invention is in the field of emergency equipment for aircraft. Further in particular, the present invention is in the field of oxygen masks for use in aircraft.

BACKGROUND

All modern aircrafts are equipped with emergency oxygen masks. In large passenger aircraft, oxygen masks are deployed for all passengers in case of a loss of cabin pressure during flight. The oxygen masks are part of self-sustained emergency oxygen systems that provide oxygen to the passengers. In modern emergency oxygen systems, the oxygen from the oxygen source is provided in oxygen pulses and supplemented with ambient air/ambient fluid. The use of current oxygen masks is not always pleasant for the wearer. Given that an emergency situation may last for a prolonged period of time, the unpleasant use of an oxygen mask may add to a state of discomfort, which a passenger may experience in an emergency situation, and may increase the safety risk associated with an aircraft emergency situation.

Accordingly, it would be beneficial to provide an oxygen mask that is pleasant to use for the wearer and that contributes to the wearer getting through an emergency situation in an unharmed manner. It would also be beneficial to provide an emergency oxygen system and an aircraft having such oxygen mask.

SUMMARY

Exemplary embodiments of the invention include an oxygen mask for use in an aircraft, comprising: a base, the base comprising an oxygen port for an inflow of oxygen from an oxygen source; face piece, protruding from a peripheral portion of the base and surrounding a breathing space; a re-directing portion, spaced from the base and arranged over the oxygen port within the breathing space; and at least one lateral opening between the base and the re-directing portion, the at least one lateral opening providing a fluid connection between the oxygen port and the breathing space.

Exemplary embodiments of the invention allow for the provision of oxygen in a diffused manner and may thus achieve a more pleasant provision of oxygen to the wearer of the oxygen mask. The re-directing portion and the at least one lateral opening may divert and diffuse the oxygen, as received from the oxygen source, and may thus allow for a more natural intake of oxygen by the wearer of the oxygen mask. As compared to previous approaches, where oxygen pulses hit the wearer's face in a highly targeted manner and at a comparably high speed, the unpleasant direct impact of oxygen pulses to the wearer's face may be prevented. An overall more pleasant wearing of the oxygen mask may be achieved. Also, the provision of the re-directing portion, arranged over the oxygen port, may reduce or even eliminate the risk of the wearer obstructing the oxygen port with his/her nose, thus contributing to a highly fail-proof oxygen mask.

The oxygen mask comprises a re-directing portion, spaced from the base and arranged over the oxygen port, and at least one lateral opening between the base and the re-directing portion. In operation, the re-directing portion and the at least one lateral opening divert and diffuse the oxygen, before it is supplied to the wearer of the oxygen mask. The re-directing portion and the at least one lateral opening may jointly also be referred to as a diffuser of the oxygen mask. In oxygen masks that supply oxygen pulses to the wearer, the diffuser may be particularly effective in preventing the wearer to be hit by unpleasant oxygen pulses. As the re-directing portion may prevent directs hits of oxygen pulses to the wearer's face, the re-directing portion may also be referred to as blocking portion. The re-directing portion may also be referred to as deflecting portion. The re-directing portion/deflecting portion may deflect the oxygen flow from its direct path towards the wearer's face.

The oxygen mask may in particular be an emergency oxygen mask, for example an emergency oxygen mask that drops from an overhead oxygen mask compartment of a commercial passenger aircraft in case of an emergency. The oxygen mask may in particular be an oxygen mask that provides oxygen pulses to the wearer during operation. It may also be referred to as a pulse oxygen mask or a passenger pulse oxygen mask.

The oxygen mask is configured for use in an aircraft. In particular, the oxygen mask may be an oronasal oxygen mask, i.e. an oxygen mask that is placed over the wearer's nose and mouth in case of an emergency. The base and the face piece form a cup that can be placed over the wearer's nose and mouth and forms, together with the wearer's face, an enclosed space. It can also be said that the base and the face piece jointly define a breathing space/breathing compartment, which is open to one side for being placed on the wearer's face. The face piece may also be referred to as mask wall.

The base and the face piece may be originally separate elements that are coupled together in a suitable manner, e.g. via gluing or welding. It is also possible that the base and the face piece are a one-piece structure. For example, the base and the face piece may be injection molded as a unitary/single piece.

The re-directing portion may be fixed in position with respect to the base in any suitable manner. For example, the re-directing portion may be coupled to the base via a support structure, exemplary implementations of which will be described in more detail below. The base on the one hand and the re-directing portion, potentially including a support structure, on the other hand may be originally separate elements that are coupled together in a suitable manner. For example, the re-directing portion, potentially including a support structure, may be glued or welded to the base. It is also possible that the base and the re-directing portion, potentially including a support structure, or a part of the base and the re-directing portion, potentially including a support structure, are a one-piece structure. In particular, the base/a part of the base and the re-directing portion, potentially including its support structure, may be injection molded as a unitary/single piece.

The base, the face piece, and the re-directing portion may be made from any material that is suitable for use in an oxygen mask for use in aircraft. For example, the base and/or the face piece and/or the re-directing portion may be made from plastics material or rubber material or silicone material or any other suitable material for use in an aircraft oxygen mask.

According to a further embodiment, the re-directing portion comprises a re-directing plate. In particular, the re-directing portion may be/may consist of a re-directing plate. With a re-directing plate, a diversion of the oxygen, coming from the oxygen source, may be achieved in a highly effective and easy to implement manner. In particular, the re-directing plate may be conveniently dimensioned to cover the full extension of the oxygen port and may be conveniently arranged and supported over the oxygen port within the breathing space.

According to a further embodiment, the oxygen mask further comprises a support structure supporting the re-directing portion with respect to the base. The re-directing portion and the support structure may be originally separate entities that are coupled together in a suitable manner. It is also possible that the re-directing portion and the support structure are a one-piece structure, in particular produced as a unitary/single piece. Further in particular, the re-directing portion and the support structure may be injection molded as a unitary/single piece.

According to a further embodiment, the support structure comprises a plurality of support legs. In particular, the support structure may comprise a plurality of support legs arranged along a peripheral portion of the re-directing portion. By supporting the re-directing portion on a plurality of support legs, a lot of room may be available for lateral openings between the support legs. Also, the space between the re-directing portion and the oxygen port may be kept free of further support elements. In this way, an effective blocking/diversion of the incoming oxygen may be achieved, while a highly open structure may allow the oxygen to quickly flow towards the wearer of the oxygen mask.

According to a further embodiment, the support structure comprises a plurality of support walls which extend between the base and the re-directing portion. With a plurality of support walls, a highly stable support of the re-directing portion with respect to the base may be achieved. The highly stable support structure may allow for a plurality of lateral openings to remain open under heavy loads/pressures, thus contributing to a high degree of reliability/fail-proof functioning. In particular, the plurality of support walls may be oriented substantially orthogonal with respect to the base and/or with respect to the re-directing portion. By being orthogonal to the base and/or to the re-directing portion, the support walls may be particularly suited to withstand/counteract forces that push the re-directing portion and the base towards each other.

According to a further embodiment, the support structure comprises two support walls, forming a cross between the base and the re-directing portion. Such a cross-shaped structure of two support walls may divide the inflow of oxygen from the oxygen source into four partial flows and may direct those four partial flows into the breathing space via four lateral openings. In this way, an effective diversion and distribution of the inflow of oxygen may be achieved, while providing for a particularly stable spacing between the base and the re-directing portion. The two support walls may in particular intersect in a substantially orthogonal manner.

According to a further embodiment, the oxygen mask comprises a plurality of lateral openings between the base and the re-directing portion. With a plurality of lateral openings, a particularly effective distribution of the oxygen flow into different directions may be achieved. A highly natural distribution of oxygen within the breathing space of the oxygen mask may be provided.

According to a further embodiment, the oxygen mask comprises between 2 and 8 lateral openings, in particular between 3 and 5 lateral openings, further in particular 4 lateral openings. With these numbers of lateral openings, a beneficial trade-off between diversion of the inflow of oxygen into different portions of the breathing space and a manageable complexity of the re-directing portion and a quick provision of oxygen to the wearer of the oxygen mask may be achieved.

According to a further embodiment, the support structure comprises a central stem, extending from the re-directing portion into the oxygen port, and a stem mount, fixing the central stem to the oxygen port. In this way, the re-directing portion may be provided over the oxygen port in a mushroom-type arrangement. The flow of oxygen may be particularly uninhibited in such an arrangement, in particular in case there are no support elements between the re-directing portion and the base. The stem mount may comprise a mounting ring, sized to engage with the oxygen port, and a plurality of support arms extending between the central stem and the mounting ring.

According to a further embodiment, the oxygen mask comprises a single lateral opening between the base and the re-directing portion, running along a peripheral portion of the re-directing portion. The single lateral opening may in particular run along the entire periphery of the re-directing portion. In other words, a 360° opening may be provided between the base and the re-directing portion. The single lateral opening may extend over a large portion or even over the entire spacing between the base and the re-directing portion. With such an arrangement, the distribution of oxygen over the breathing space may take place in a particularly uninhibited manner.

According to a further embodiment, the re-directing portion and the at least one lateral opening are arranged to divert at least 90% of the inflow of oxygen to angles of less than 45° with respect to the base. In particular, the re-directing portion and the at least one lateral opening may be arranged to divert at least 90% of the inflow of oxygen to angles of less than 30° with respect to the base. Further in particular, the re-directing portion and the at least one lateral opening may be arranged to divert at least 90% of the inflow of oxygen to angles of less than 20° with respect to the base. With the diversion of at least 90% of the inflow of oxygen to the given angular ranges, a particularly convenient use of the oxygen mask may be achieved. In particular, it may be achieved that a very large portion or even all of the inflow of oxygen does not hit the wearer's face directly, but is diffused efficiently into the breathing space, from where it can be inhaled by the wearer in a comparably natural manner. As compared to situations where the inflow of oxygen leaves the base at an angle of about 90°, which may be the case in the absence of the re-directing portion and the at least one lateral opening, the hard hits to the wearer's face with high pressure fluid pulses may be prevented. The expression inflow of oxygen refers to the inflow of oxygen via the oxygen port in the base of the oxygen mask.

According to a further embodiment, the base comprises a base plate. The re-directing portion, in particular the re-directing plate, may be substantially parallel to such base plate. The peripheral portion of the base, from which the face piece protrudes, may be the outer circumferential surface of the base plate or may be a peripheral region of the surface of the base plate facing the breathing space or may be a combination thereof.

According to further embodiment, the oxygen mask further comprises an oxygen hose coupled to the oxygen port. The oxygen hose may provide for the fluid connection from the oxygen source to the oxygen port and, thus, to the breathing space of the oxygen mask. The oxygen hose may in particular be oriented substantially orthogonal with respect to the base where the oxygen hose is coupled to the oxygen port. In other words, the oxygen hose may be oriented substantially orthogonal with respect to the base at the coupling point between the oxygen hose and the base. The oxygen hose may be made from an elastic material and may have differing orientations along its length. For example, when the oxygen mask is stored in an overhead oxygen mask compartment above a passenger seat, the oxygen hose may be rolled up to accommodate the oxygen mask in the confined space of the overhead oxygen mask compartment.

According to a further embodiment, the base has an inlet valve. Via the inlet valve, ambient air/ambient fluid may be supplied in addition to the oxygen from the oxygen source. While said ambient air may have too little oxygen content to satisfy the wearer's oxygen needs, it may help in transporting the oxygen from the oxygen source towards the wearer's lungs and may, thus, contribute to a high efficiency of the oxygen mask. The inlet valve may in particular be a spring valve.

According to a further embodiment, the base has an outlet valve. Via the outlet valve, the fluids exhaled by the wearer of the oxygen mask may be discharged to the environment. Having an inlet valve and/or an outlet valve, the base may also be referred to as a valve plate.

According to a further embodiment, the oxygen mask further comprises an elastic band for securing the oxygen mask to a wearer's face. The elastic band may in particular be coupled to the base and/or to the face piece. Exemplary embodiments of the invention further include an emergency oxygen system, comprising: an oxygen source; and at least one oxygen mask, as described in any of the embodiments above, coupled to the oxygen source. The additional features, modifications and effects, as described with respect to the oxygen mask, apply to the emergency oxygen system in an analogous manner.

According to a further embodiment, the oxygen source comprises a control unit and the control unit is configured to control the oxygen source to provide an oxygen supply pulse in response to a wearer's inhaling action. The control unit may be configured to detect the wearer's inhaling action via the pressure in the breathing space and/or in the oxygen hose. For example, the control unit may be configured to control the oxygen source to provide an oxygen supply pulse in response to detecting a momentary pressure in the breathing space and/or the oxygen hose below a predetermined trigger threshold value.

Exemplary embodiments of the invention further include an aircraft, comprising a plurality of oxygen masks, as described in any of the embodiments above. Exemplary embodiments of the invention also include an aircraft, comprising a plurality of emergency oxygen systems, as described in any of the embodiments above. The additional features, modifications and effects, as described with respect to the oxygen mask and/or with respect to the emergency oxygen system, apply to the aircraft in an analogous manner.

DETAILED DESCRIPTION

Figure 1:
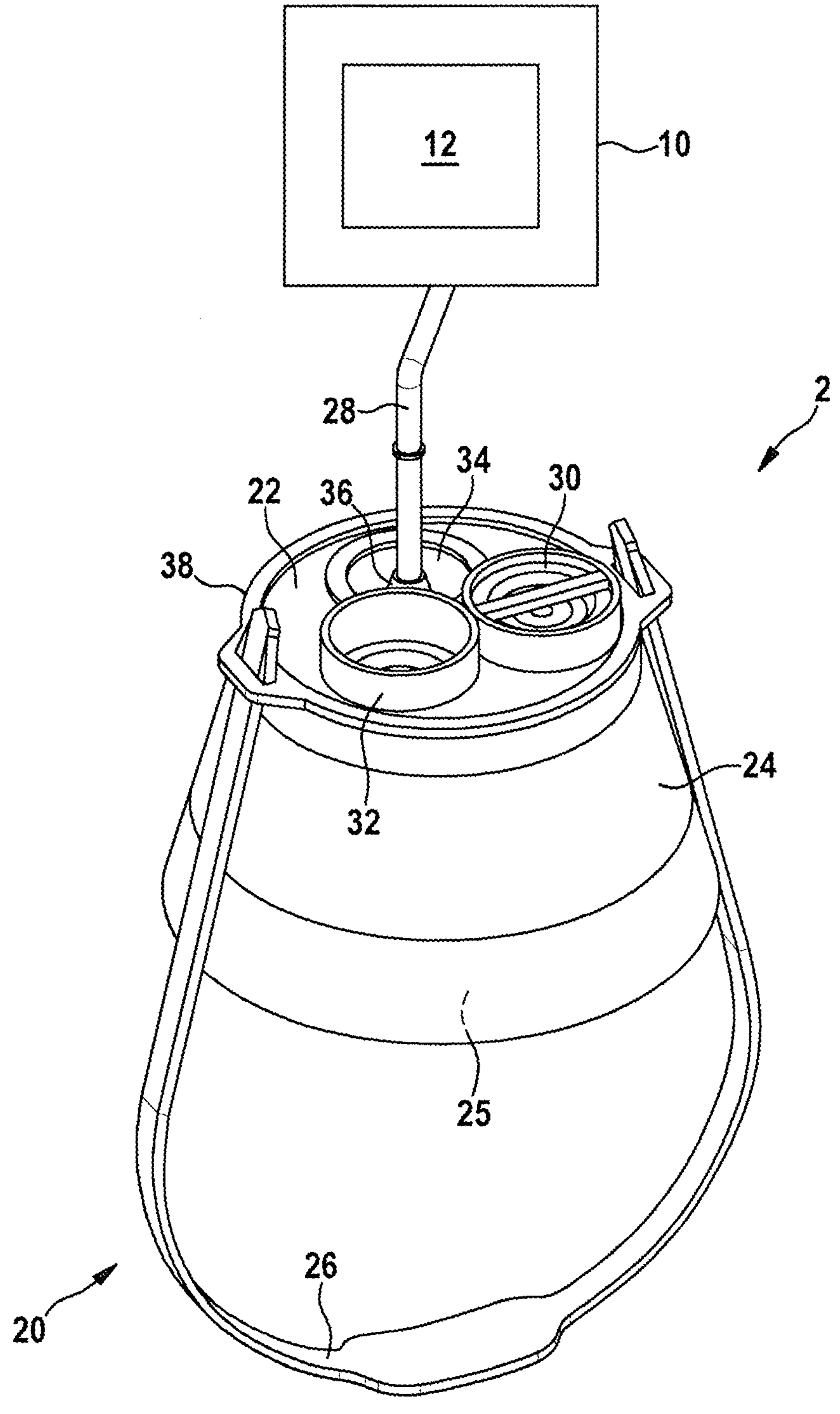
FIG. 1 shows an emergency oxygen system in accordance with an exemplary embodiment of the invention, having an oxygen mask in accordance with an exemplary embodiment of the invention, the emergency oxygen system being depicted partly in a perspective view and partly as a block diagram.

FIG. 1 shows an emergency oxygen system 2 in accordance with an exemplary embodiment of the invention, partly depicted in a perspective view and partly depicted as a block diagram. The emergency oxygen system 2 comprises an oxygen source 10. The oxygen source 10 in turn comprises a control unit 12. The control unit 12 is configured to control the discharge of oxygen from the oxygen source 10 in operation. While the oxygen source 10 is able to provide oxygen to a plurality of oxygen masks, FIG. 1 depicts an exemplary situation where the oxygen source 10 is connected to one oxygen mask only.

The emergency oxygen system 2 comprises an oxygen mask 20 that is coupled to the oxygen source 10 via an oxygen hose 28. The oxygen mask 20 comprises a base 22, to which a variety of components of the oxygen mask 20 are coupled/at which a variety of components of the oxygen mask 20 are arranged.

The oxygen mask 20 comprises a face piece 24 and an elastic band 26. The face piece 24 and the elastic band 26 are mounted to the base 22 via a mounting ring 38. The mounting ring 38 runs along a peripheral portion of the base 22 and forms fastening means for the face piece 24 and the elastic band 26. The face piece 24 protrudes from the base 22 and surrounds a breathing space 25. Together, the base 22 and the face piece 24 form a cup-like structure, whose interior is the breathing space 25. In operation, a wearer may place said cup over his/her nose and mouth and may fasten the oxygen mask 20 with respect to his/her head via the elastic band 26.

As stated above, the oxygen mask 20 has an oxygen hose 28, which provides for a fluid connection between the breathing space 25 and the oxygen source 10. In operation, oxygen is provided from the oxygen source 10 via the oxygen hose 28 and via an oxygen port 36 to the breathing space 25. The oxygen port 36 is the connection through the base 22, where a fluid path between the oxygen hose 28 and the breathing space 25 is established. In the exemplary embodiment of FIG. 1, the oxygen hose 28 is coupled to the base 22 via an insert 34. The insert 34 is a somewhat extended structure that is fixedly connected to the oxygen hose 28 and that is placed in a corresponding opening of the base 22. The insert 34 is considered part of the base 22. It is also possible that the base 22 does not have such an insert and that the oxygen hose is coupled to the base 22 via other suitable means. For example, the oxygen hose 28 may be slid onto a suitable fitting in the base 22. The base 22 and the connection to the oxygen hose 28 may be designed with the goal of keeping the assembly height of the components low. This may contribute to making the folding of the oxygen mask 20 and the storage thereof in an overhead compartment comparably easy/comparably little space-consuming. The components of the oxygen mask 20 may be produced via any suitable manufacturing technique, they may in particular be injection moulded or manufactured via additive manufacturing.

The oxygen mask 20 further comprises a re-directing portion that is arranged within the breathing space 25 and over the oxygen port 36. The re-directing portion is not visible in FIG. 1. The details and functioning of said re-directing portion will be described below with respect to FIGS. 2 and 3.

The oxygen mask 20 further comprises an inlet valve 30 and an outlet valve 32. The inlet valve 30 and the outlet valve 32 are arranged at the base 22 and provide for selective fluid communication between the breathing space 25 and an environment of the oxygen mask 20.

The operation of the emergency oxygen system 2 of FIG. 1 is now described with respect to a breathing cycle of a person wearing the oxygen mask 20. When the person inhales, the control unit 12 of the oxygen source 10 detects a pressure below a predetermined trigger threshold value and controls the oxygen source 10 to provide an oxygen pulse via the oxygen hose 28 into the breathing space 25. At the same time or shortly thereafter, the inlet valve 30 opens and ambient air/ambient fluid is provided in addition to the oxygen pulse. The person wearing the oxygen mask 20 inhales the oxygen from the oxygen source 10 and the ambient air/ambient fluid, having entered into the breathing space 25 via the inlet valve 30. When exhaling, the fluids exhaled by the person wearing the mask are discharged to the environment via the outlet valve 32.

Figure 2A:
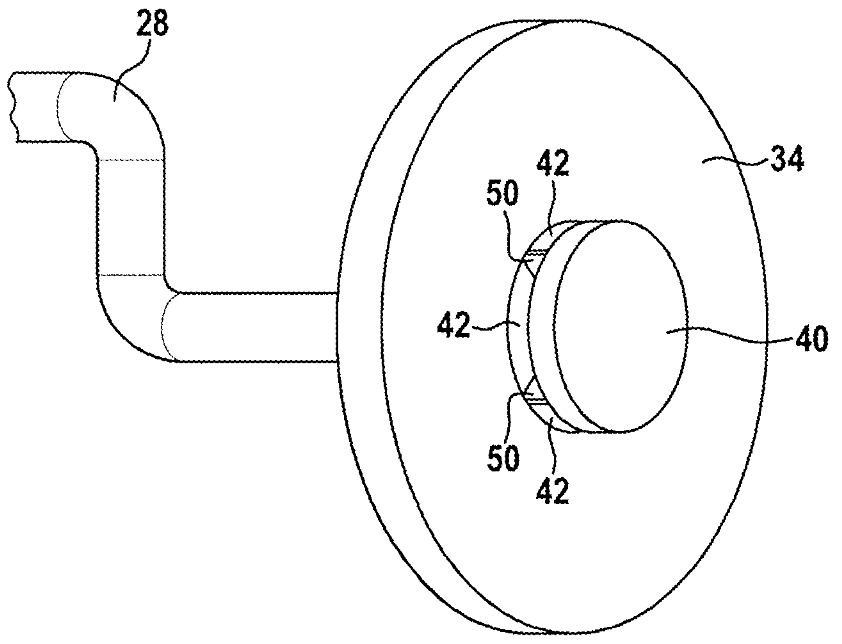
FIG. 2A and FIG. 2B shows selected components of the oxygen mask of FIG. 1 in different perspective views.

FIG. 2A shows selected components of the oxygen mask 20 of FIG. 1 in another perspective view. In particular, FIG. 2A shows the insert 34, which forms part of the base 22, and the oxygen hose 28, which ends in the insert 34 in the oxygen port 36. While being not visible in FIG. 1, the oxygen mask 20 of FIG. 1 comprises a re-directing portion 40 and a plurality of lateral openings 42. In the viewing direction of FIG. 2A, the re-directing portion 40 and the plurality of lateral openings 42 are visible. In the viewing direction of FIG. 1, the re-directing portion 40 and the plurality of lateral openings 42 would be visible, when looking into the cup-like structure, formed by the base 22 and the face piece 24, from the bottom.

The re-directing portion 40 is arranged over the oxygen port 36. It prevents an inflow of oxygen via the oxygen port in a direction that is orthogonal to the base 22/orthogonal to the insert 34 of the base 22. The re-directing portion 40 gives the inflow of oxygen from the oxygen source a lateral direction. The re-directing portion 40 is spaced from the base 22/from the insert 34 of the base 22, and the plurality of lateral openings 42 are provided in said space between the re-directing portion 40 and the base 22/the insert 34 of the base 22.

In the exemplary embodiment of FIG. 2A, four lateral openings 42 are provided. In operation, the inflow of oxygen is divided between said four lateral openings 42 and is diffused into different portions of the breathing space of the oxygen mask via said diversion by the re-directing portion 40. The four lateral openings 42 are formed by two support walls 50 that are arranged between the re-directing portion 40 and the base 22/insert 34 of the base 22. The two support walls 50 form a cross on the re-directing portion 40, in particular on a back-side thereof when seen from the breathing space.

In the exemplary embodiment of FIG. 2A, the re-directing portion 40 is a re-directing plate. The re-directing plate is arranged substantially parallel to the base 22/to the insert 34 of the base 22 and is arranged substantially orthogonal to the direction of the inflow of oxygen at the coupling point between the oxygen hose 28 and the base 22. By being plate-shaped and being arranged as described, the re-directing portion 40 forms an abrupt barrier for the inflow of oxygen and achieves a strong diversion of the fluid flow. In particular, the re-directing portion 40 and the plurality of lateral openings 42 are arranged to divert at least 90% of the inflow of oxygen to angles of less than 45° with respect to the base 22/with respect to the insert 34 of the base 22. In this way, no or almost no oxygen hits the wearer's face directly. Rather, all or almost all of the inflow of oxygen is diffused into the breathing space 25 and can be inhaled in a more convenient manner by the wearer of the mask.

Figure 2B:
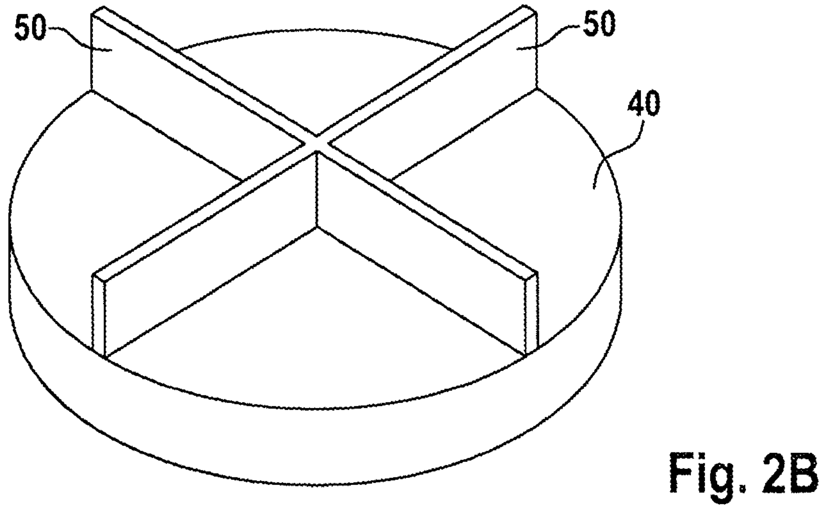

FIG. 2B shows the re-directing portion 40 and the support walls 50 of FIG. 2A in a different perspective view. In particular, FIG. 2B shows the back-side of the re-directing portion 40, as compared to the viewing direction of FIG. 2A. The two support walls 50 are intersecting walls that protrude substantially orthogonal from the re-directing portion 40. They can also be said to form a cross on the re-directing portion 40. The two support walls 50 form a support structure that supports the re-directing portion 40 with respect to the base 22.

The re-directing portion 40 and the two support walls 50 have a somewhat larger extension than the oxygen port 36, such that they fully block the unimpeded inflow of oxygen from the oxygen port 36 and such that the two support walls 50 can firmly rest on the base 22/the insert 34 of the base 22 and provide a highly stable support to the re-directing portion 40.

Figure 3A:
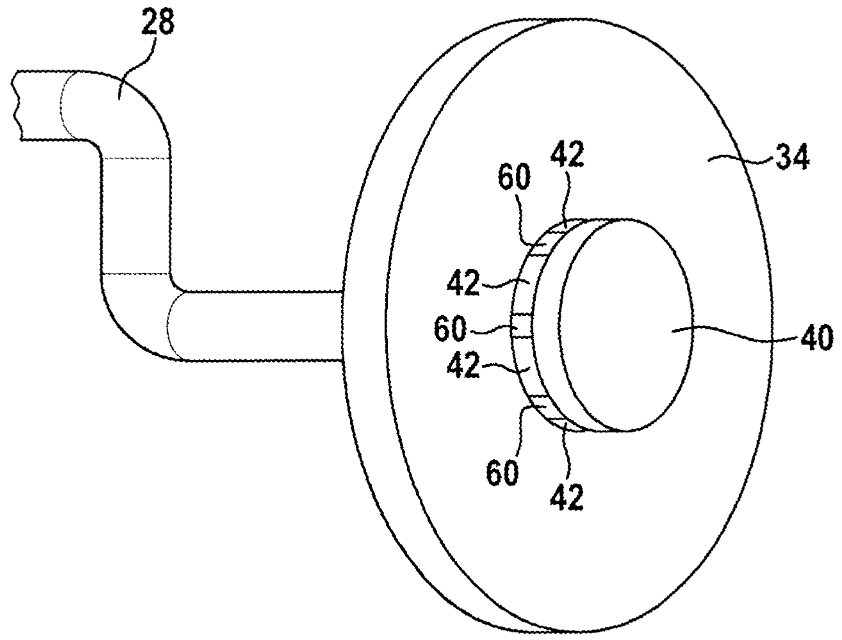
FIG. 3A and FIG. 3B shows a modified version of the selected components of the oxygen mask of FIG. 1 in different perspective views.

FIG. 3A shows a modified version of the selected components of FIG. 2A in an analogous perspective view. As compared to the components depicted in FIG. 2A and described above, only the support structure of the re-directing portion 40 with respect to the base 22/the insert 34 of the base 22 is different. In particular, instead of the two support walls, depicted and described with respect to FIG. 2, six support legs 60 are provided. The six support legs 60 are arranged along a peripheral portion of the re-directing portion 40 and provide support for the re-directing portion 40 with respect to the base 22/the insert 34 of the base 22. The support legs 60 leave the back-side of the re-directing portion 40 mostly free of flow-inhibiting elements. In this way, the inflow of oxygen can be diverted and diffused in a very uninhibited manner and may quickly reach the breathing space of the oxygen mask. Also, the lateral openings 42, provided between the support legs 60, are large in cross-sectional area.

Figure 3B:
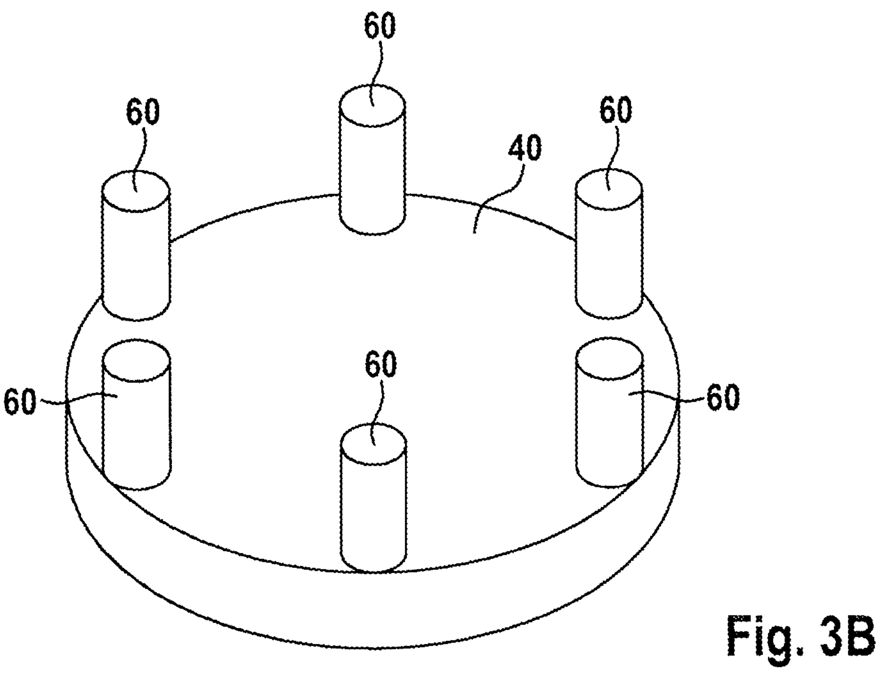

FIG. 3B shows the re-directing portion 40 and the support legs 60 in a different perspective view. In particular FIG. 3B shows the back-side of the re-directing portion 40, as compared to the viewing direction of FIG. 3A. The viewing direction of FIG. 3B corresponds to the viewing direction of FIG. 2B.

Figure 4A:
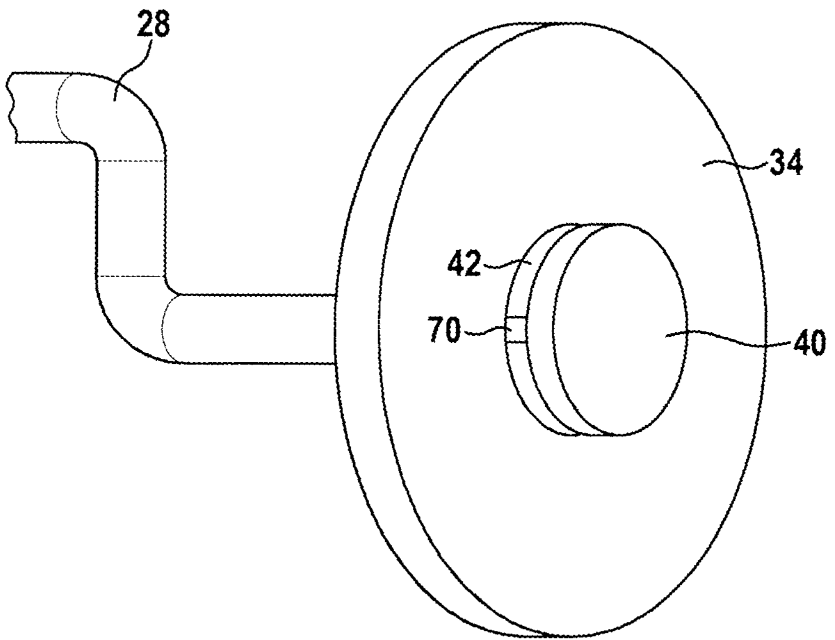
FIG. 4A and FIG. 4B shows another modified version of the selected components of the oxygen mask of FIG. 1 in different perspective views.

FIG. 4A shows another modified version of the selected components of FIG. 2A in an analogous perspective view. As compared to the components depicted in FIG. 2A and described above, only the support structure of the re-directing portion 40 with respect to the base 22/the insert 34 of the base 22 is different. In particular, instead of the two support walls, depicted and described with respect to FIG. 2, a support structure having a central stem 70 and a stem mount 72 is provided. The central stem 70 and the stem mount are not provided close to the periphery of the re-directing portion, such that only a small section of the stem 70 is visible in the viewing direction of FIG. 4A. They will therefore be described below with respect to FIG. 4B. The embodiment of FIG. 4 comprises a single lateral opening 42, which runs along the full periphery of the re-directing portion. The single lateral opening 42 has the full height/extends over the full spacing between the base 22/insert of the base 22 and the re-directing portion 40.

Figure 4B:
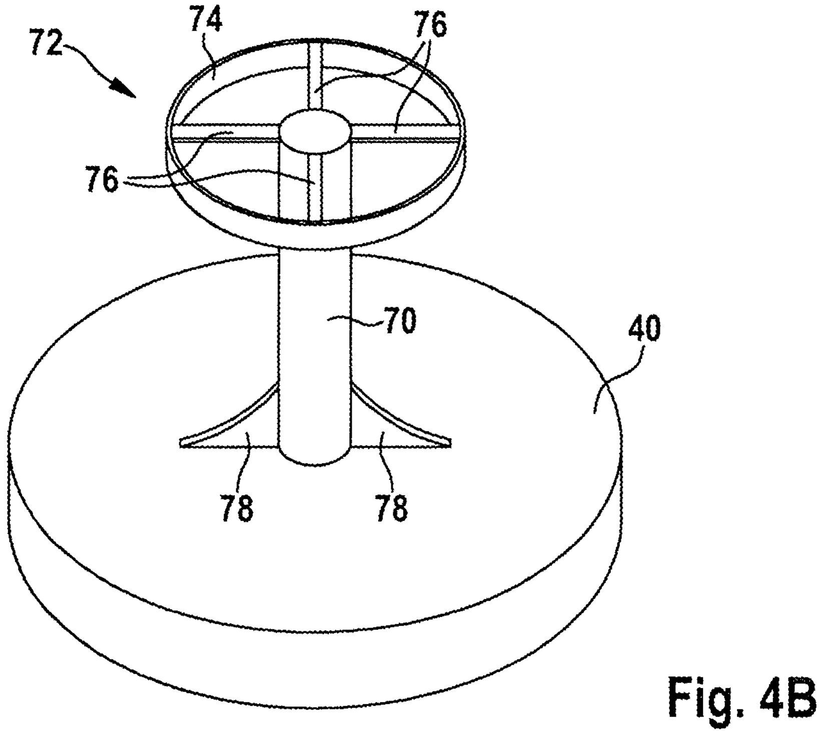

FIG. 4B shows the re-directing portion 40 and its support structure in a different perspective view. In particular FIG. 4B shows the back-side of the re-directing portion 40, as compared to the viewing direction of FIG. 4A. The viewing direction of FIG. 4B corresponds to the viewing direction of FIG. 2B. As stated above, the support structure of the embodiment of FIG. 4 comprises a central stem 70 and a stem mount 72. The central stem 70 extends from a central portion of the re-directing portion 40 and has a length to extend into the oxygen port 36, depicted in FIG. 1. The central stem 70 may be additionally supported with respect to the re-directing portion 40 via re-enforcing ribs 78.

The stem mount 72 comprises a mounting ring 74 and a plurality of support arms 76. In the exemplary embodiment of FIG. 4, the stem mount 72 comprises four support arms 76. The support arms 76 extend between the central stem 70 and the mounting ring 74. The mounting ring 74 is sized to engage with the oxygen port 36. In particular, the mounting ring 74 is sized to abut an inner wall of the oxygen port 36. It may be press-fit into the oxygen port 36 or attached to the oxygen port 36 in any other suitable manner. The central stem 70 and the stem mount 72 allow for the re-directing portion 40 to be supported in a mushroom-like manner with respect to the base 22/with respect to the insert 34 of the base 22.

Figure 5:
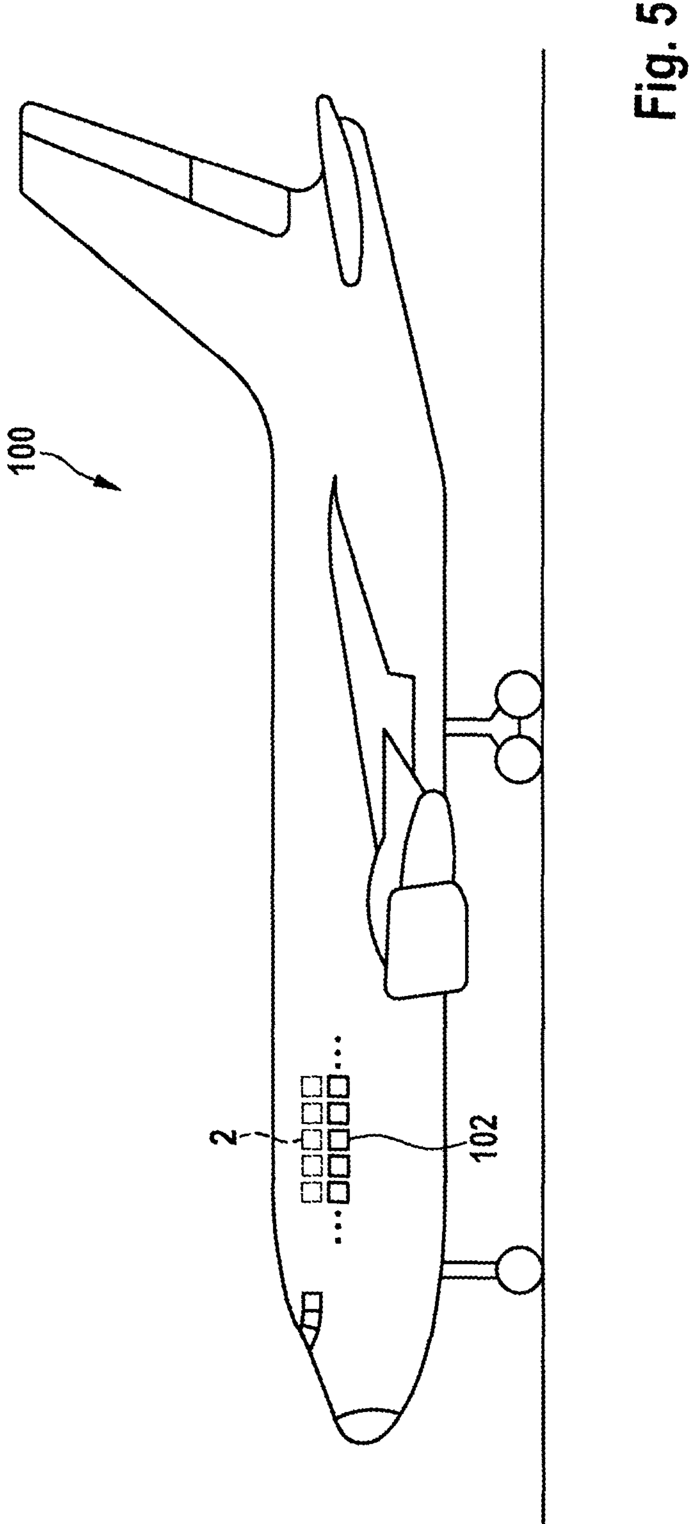
FIG. 5 shows an aircraft in accordance with an exemplary embodiment of the invention in a side view.

FIG. 5 shows an aircraft 100 in accordance with an exemplary embodiment of the invention in a side view. In the exemplary embodiment of FIG. 5, the aircraft 100 is a large commercial passenger airplane. It is also possible that the aircraft is a private airplane or a military aircraft.

The aircraft 100 comprises a plurality of emergency oxygen systems 2, which may be embodied in accordance with the embodiment shown in FIG. 1. In particular, each row of seats of the aircraft 100 may have two emergency oxygen systems 2 associated therewith, one for the seats to the left side of the aisle and one for the seats to the right side of the aisle. For the exemplary embodiment of each row having six seats, every emergency oxygen system 2 may have one oxygen source and three oxygen masks, coupled to the oxygen source. This set-up is illustrated in FIG. 5 via five exemplary passenger windows 102, each being associated with a row of seats, and via five exemplary emergency oxygen systems 2, depicted in phantom due to their arrangement within the aircraft.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

What is claimed is:

1. An oxygen mask for use in an aircraft, comprising:

a base, the base comprising:

an oxygen port for an inflow of oxygen from an oxygen source;

an inlet valve for supplying ambient air in addition to the oxygen from the oxygen source;

an outlet valve for discharging fluids exhaled by a wearer of the oxygen mask to an environment of the oxygen mask; and a base plate, at which the oxygen port, the inlet valve, and the outlet valve are arranged;

a face piece, protruding from a peripheral portion of the base and surrounding a breathing space, wherein the base and the face piece jointly form a cup-like structure, defining the breathing space;

a re-directing portion, spaced from the base and arranged over the oxygen port within the breathing space; and at least one lateral opening between the base and the re-directing portion, the at least one lateral opening providing a fluid connection between the oxygen port and the breathing space, wherein the re-directing portion comprises a re-directing plate and wherein the re-directing portion and the at least one lateral opening divert and diffuse the oxygen, as received from the oxygen source via the oxygen port, into the breathing space with the re-directing portion forming an abrupt barrier for the inflow of oxygen from the oxygen source, and wherein the oxygen mask further comprises a plurality of support structures supporting the re-directing portion with respect to the base, wherein the plurality of support structures comprise a plurality of support walls which protrude from the re-directing portion and extend between the base and the re-directing portion, and wherein the plurality of support walls are in particular oriented substantially orthogonal with respect to at least one of the base or the re-directing portion.

2. The oxygen mask according to claim 1, wherein the at least one lateral opening between the base and the re-directing portion comprises a plurality of lateral openings between the base and the re-directing portion, in particular between 2 and 8 lateral openings, further in particular between 3 and 5 lateral openings, further in particular 4 lateral openings.

3. The oxygen mask according to claim 1, wherein the plurality of support structures comprise a plurality of support legs, wherein the plurality of support legs are arranged along a peripheral portion of the re-directing portion.

4. The oxygen mask according to claim 1, wherein the plurality of support structures comprise two support walls, forming a cross between the base and the re-directing portion, with the two support walls in particular intersecting in a substantially orthogonal manner.

5. The oxygen mask according to claim 1, wherein the plurality of support structures comprise a central stem, extending from the re-directing portion into the oxygen port, and a stem mount, fixing the central stem to the oxygen port.

6. The oxygen mask according to claim 1, wherein the re-directing portion and the at least one lateral opening are arranged to divert at least 90% of the inflow of oxygen to angles of less than 45°, in particular less than 30°, further in particular less than 20°, with respect to the base.

7. The oxygen mask according to claim 1, wherein the oxygen mask further comprises an oxygen hose coupled to the oxygen port, wherein the oxygen hose is in particular oriented substantially orthogonal with respect to the base where the oxygen hose is coupled to the oxygen port.

8. The oxygen mask according to claim 1, wherein the oxygen mask further comprises an elastic band for securing the oxygen mask to a wearer's face, the elastic band in particular being coupled to the base and/or to the face piece.

9. An emergency oxygen system, comprising:

the oxygen source, and the oxygen mask according to claim 1, coupled to the oxygen source.

10. An emergency oxygen system according to claim 9, wherein the oxygen source comprises a control unit and wherein the control unit is configured to control the oxygen source to provide an oxygen supply pulse in response to a wearer's inhaling action.

11. An aircraft comprising a plurality of oxygen masks in accordance with claim 1.

12. The oxygen mask according to claim 1, wherein the at least one lateral opening between the base and the re-directing portion comprises a single lateral opening between the base and the re-directing portion, running along a peripheral portion of the re-directing portion.

13. The emergency oxygen system according to claim 10, wherein the control unit is configured to detect the inhaling action of the wearer of the oxygen mask via pressure in an oxygen hose coupled to the oxygen port.

14. The emergency oxygen system according to claim 10, wherein the control unit is configured to detect the inhaling action of the wearer of the oxygen mask via pressure in the breathing space.

* * * * *